(12) United States Patent
Hazeki

(10) Patent No.: US 9,488,934 B2
(45) Date of Patent: Nov. 8, 2016

(54) BELT CIRCLING DEVICE, TRANSFER DEVICE, AND IMAGE FORMING APPARATUS

(71) Applicant: FUJI XEROX CO., LTD., Tokyo (JP)

(72) Inventor: Shingo Hazeki, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/600,710

(22) Filed: Jan. 20, 2015

(65) Prior Publication Data

US 2016/0054685 A1    Feb. 25, 2016

(30) Foreign Application Priority Data

Aug. 22, 2014    (JP) ................................. 2014-169687

(51) Int. Cl.
*G03G 15/16* (2006.01)
*F16H 7/12* (2006.01)
*F16H 7/08* (2006.01)

(52) U.S. Cl.
CPC ........ *G03G 15/1615* (2013.01); *F16H 7/1281* (2013.01); *F16H 2007/0842* (2013.01); *F16H 2007/0865* (2013.01)

(58) Field of Classification Search
CPC ......... G03G 2215/00143; G03G 2215/00147; G03G 2215/00151; G03G 2215/00156; G03G 2215/00168
See application file for complete search history.

(56) References Cited

U.S. PATENT DOCUMENTS

| 5,659,851 A * | 8/1997 | Moe ...................... B65G 39/16 226/15 |
| 2008/0019736 A1 | 1/2008 | Ryo et al. |
| 2013/0064572 A1* | 3/2013 | Shiba ................. G03G 15/0189 399/121 |

FOREIGN PATENT DOCUMENTS

| JP | 2002-196561 A | 7/2002 |
| JP | 2008-026676 A | 2/2008 |
| JP | 2008-197128 A | 8/2008 |

\* cited by examiner

*Primary Examiner* — Minh Phan
*Assistant Examiner* — Victor Verbitsky
(74) *Attorney, Agent, or Firm* — Oliff PLC

(57) ABSTRACT

Provided is a belt circling device including a belt supported to be capable of circling by plural rotating members provided rotatably on side plates, a displacement member that is displaced while being in contact with the belt, a correction unit that includes a contact member that is in contact with the belt on an upstream side or on a downstream side from the displacement member in a circling direction of the belt and a movement section that causes the contact member to be movable in an intersecting direction intersecting with the circling direction and that corrects a deviation of the moving belt, and a connection member that is provided on the side plate, is displaced with respect to the side plate with following the displacement member, and connects the displacement member and the movement section to each other.

4 Claims, 11 Drawing Sheets

BELT CIRCLING DEVICE, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2014-169687 filed Aug. 22, 2014.

BACKGROUND

Technical Field

The present invention relates to a belt circling device, a transfer device, and an image forming apparatus.

SUMMARY

According to an aspect of the invention, there is provided a belt circling device including:

a belt supported to be capable of circling by plural rotating members provided rotatably on side plates;

a displacement member that is displaced while being in contact with the belt;

a correction unit that includes a contact member that is in contact with the belt on an upstream side or on a downstream side from the displacement member in a circling direction of the belt and a movement section that causes the contact member to be movable in an intersecting direction intersecting with the circling direction and that corrects a deviation of the moving belt; and a connection member that is provided on the side plate, is displaced with respect to the side plate with following the displacement member, and connects the displacement member and the movement section to each other.

BRIEF DESCRIPTION OF THE DRAWINGS

Exemplary embodiments of the present invention will be described in detail based on the following figures, wherein.

DETAILED DESCRIPTION

First Exemplary Embodiment

Examples of a belt circling device, a transfer device, and an image forming apparatus according to the first exemplary embodiment are described.

Entire Configuration

Figure 1:
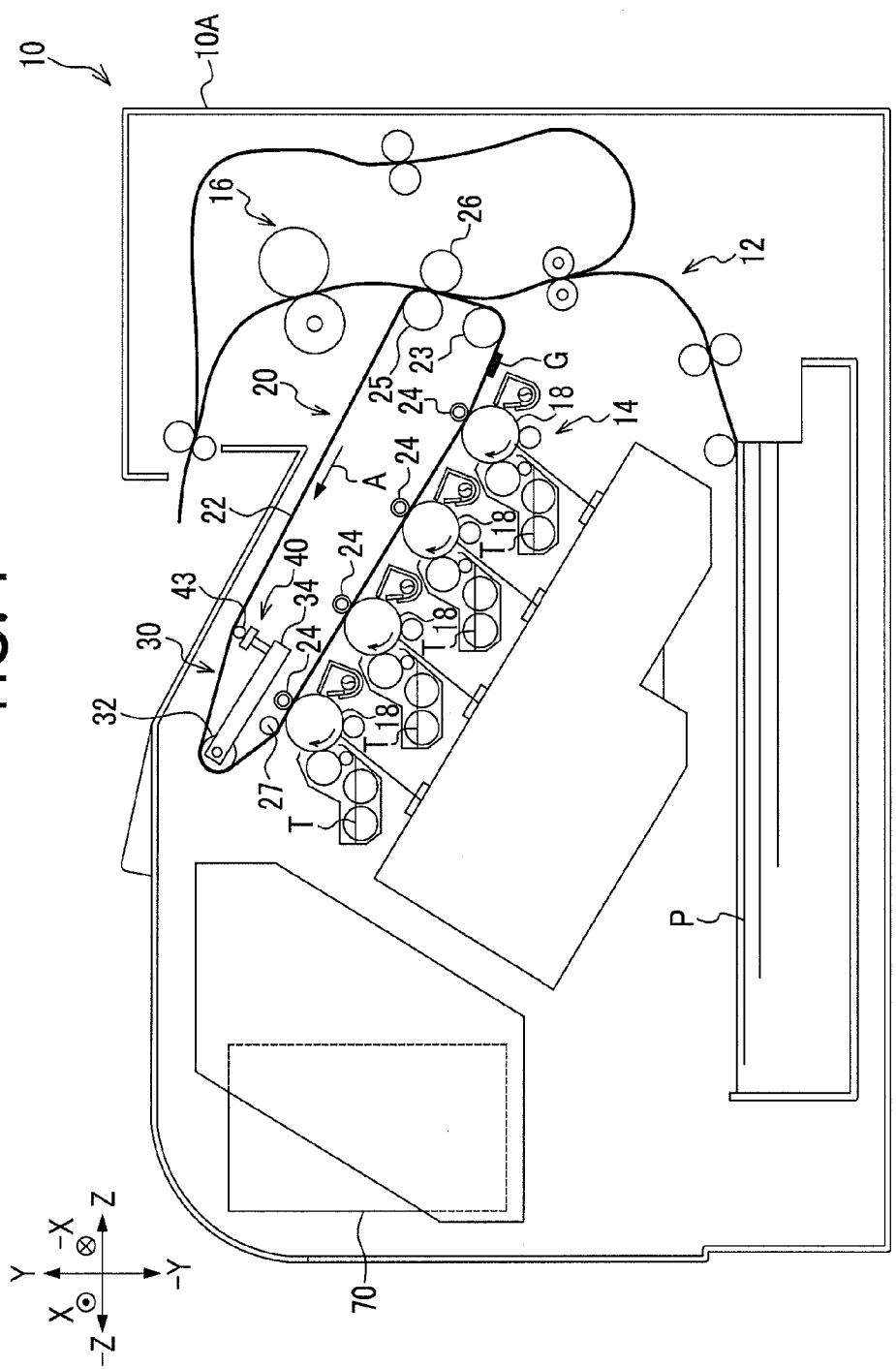
FIG. 1 is a view schematically illustrating an entire configuration of an image forming apparatus according to a first exemplary embodiment.

In FIG. 1, an image forming apparatus 10 according to the first exemplary embodiment is illustrated. As an example, the image forming apparatus 10 includes a transport unit 12 that transports a sheet P, an image forming unit 14 that forms a toner image G by using toner T, a transfer unit 20 that transfers the toner image G to the sheet P that is transported, and a fixing unit 16 that fixes the toner image G to the sheet P.

The sheet P is an example of a recording medium. The toner T is an example of a developer. The toner image G is an example of a developer image. The image forming unit 14 is an example of a forming unit. In addition, as an example, the image forming unit 14 includes a photosensitive body 18 and is an electrophotographic process unit that performs processes of charging, exposure, developing, and cleaning. The transfer unit 20 is an example of a transfer device.

In the following description, when a user (not illustrated) views the front of the image forming apparatus 10 from a standing position, a height direction, a width direction, and a depth direction of the apparatus are described as a Y direction, a Z direction, and an X direction, respectively. The X direction, the Y direction, and the Z direction are orthogonal to one another. In addition, in a case where there is a need to distinguish one side and the other side of each of the X direction, the Y direction, and the Z direction, it is described that the upper side is a Y side, the lower side is a −Y side, the right side is a Z side, the left side is a −Z side, the front side is an X side, and the rear side is a −X side, in a front view of the image forming apparatus 10.

Configurations of Principal Components

Next, the transfer unit 20 will be described.

The transfer unit 20 illustrated in FIG. 1 includes an intermediate transfer belt 22 as an example of a belt, and a pair of side plates 29 (see FIG. 3) that configure a part of a main body of the transfer unit 20. In addition, the transfer unit 20 includes a belt moving unit 30 as an example of the belt circling device, a primary transfer roll 24 as an example of a first transfer member, and a secondary transfer roll 26 as an example of a second transfer member.

A circling direction (movement direction) of the intermediate transfer belt 22 is described as an A direction (arrow A in FIG. 1) and a bias direction in which the intermediate transfer belt 22 is biased by a spring 36 (see FIG. 2) to be described later is described as a B direction (arrow B in FIG. 2). Further, a direction orthogonal to the X direction and the B direction is described as a C direction. The C direction is an example of an intersecting direction. In addition, in a case where there is a need to distinguish one side and the other side of the C direction, each side is described as a C side or a −C side.

Side Plate

Figure 3:
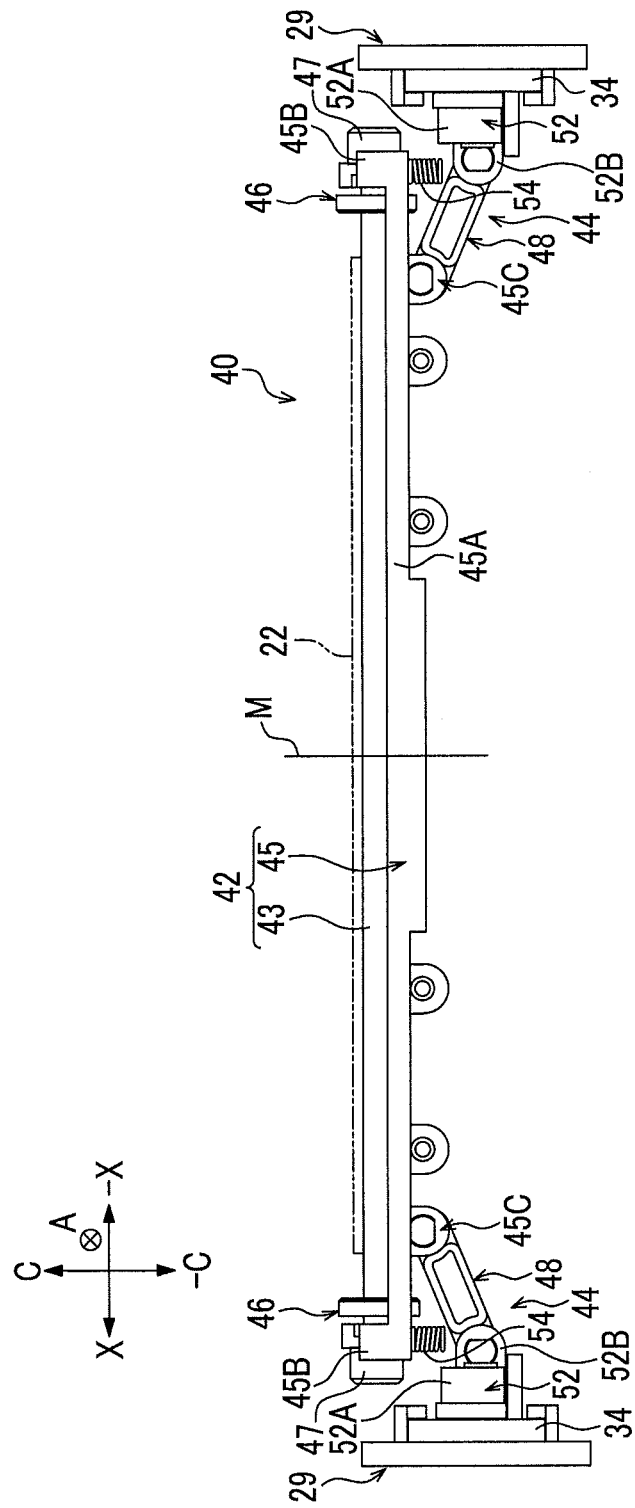
FIG. 3 is a front view illustrating a correction section according to the first exemplary embodiment when viewed in a moving direction of an intermediate transfer belt.

As illustrated in FIG. 3, the pair of side plates 29 are disposed to face each other by being spaced from each other in the X direction which is an out-of-plane direction. In addition, the pair of side plates 29 support a drive roll 23 to be described later, the primary transfer roll 24, a driven roll 25, and a winding roll 27 (see FIG. 1) rotatably with the X direction as an axial direction, and support a connection member 34 to be described later. Since the pair of side plates 29 are disposed symmetrically with respect to a center line M that is positioned at the center in the X direction, the side plate 29 on the X side is described, and description of the side plate 29 on the −X side will be omitted.

Figure 4A:
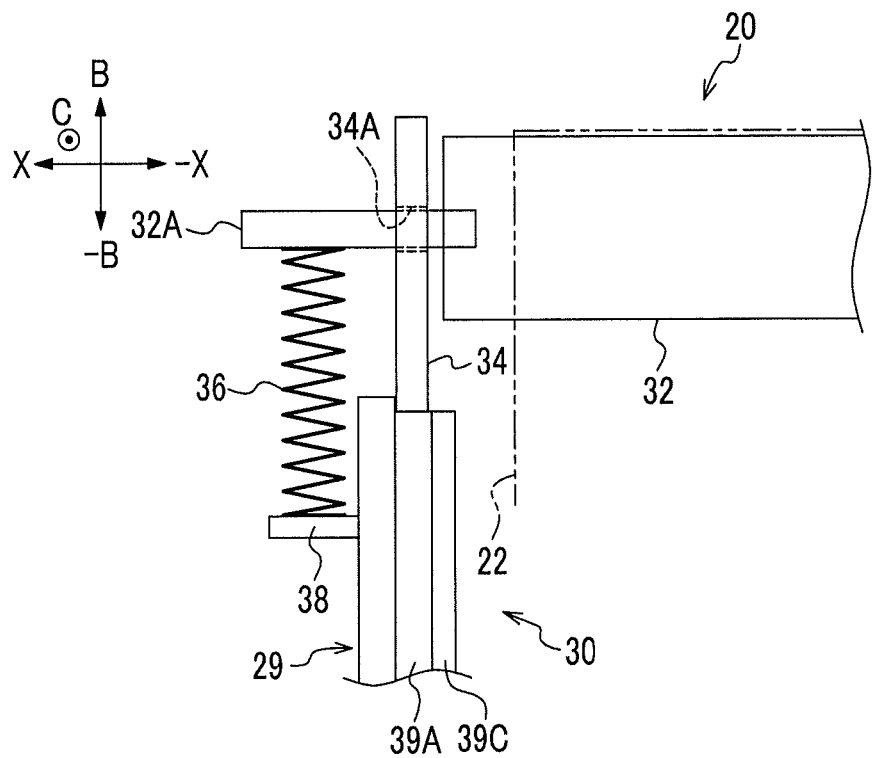
FIG. 4A is an enlarged plan view illustrating a part of the correction section according to the first exemplary embodiment.

As illustrated in FIG. 4A, an attachment section 38 that protrudes from the side plate 29 toward the X side is formed on the side plate 29. The attachment section 38 is a plate-like section that is widened along an X-C plane. In addition, one end of the spring 36 to be described later is attached to the attachment section 38.

Figure 4B:
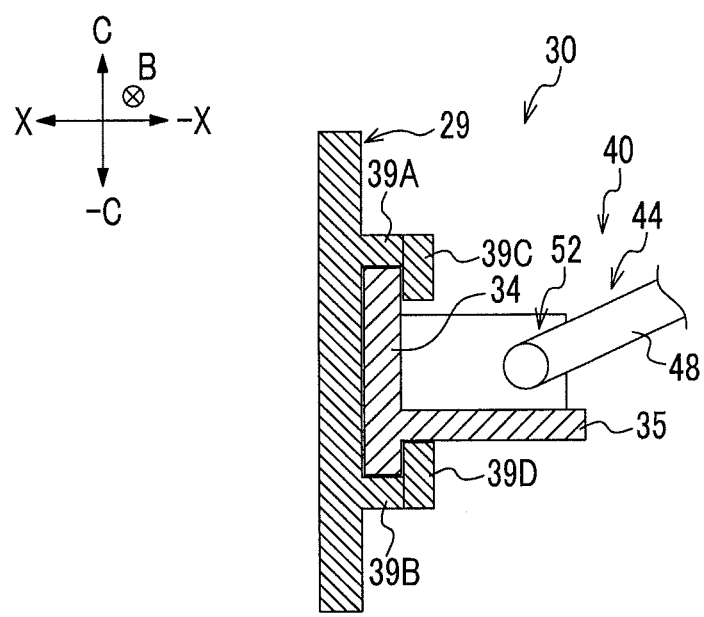
FIG. 4B is a view of an enlarged longitudinal section illustrating apart of the correction section according to the first exemplary embodiment.

As illustrated in FIG. 4B, plate-like sticking-out portions 39A and 39B which are spaced from each other in the C direction and stick out from the side plate 29 toward the −X side are formed on the −X side of the side plate 29. A retaining plate 39C is attached to one end of the sticking-out portion 39A on the −X side by using a screw (not illustrated). In addition, a retaining plate 39D is attached to one end of the sticking-out portion 39B on the −X side by using a screw (not illustrated). The retaining plates 39C and 39D are disposed to be spaced from each other in the C direction. The connection member 34 to be described later is inserted into a space surrounded by the side plate 29, the sticking-out portions 39A and 39B, and the retaining plates 39C and 39D.

Intermediate Transfer Belt

The intermediate transfer belt 22 illustrated in FIG. 1 is configured to have an endless (annular) belt that is made of a compound in which a polyimide resin or a polyamide resin is mixed with an antistatic agent such as carbon black. In addition, as an example, the intermediate transfer belt 22 is provided to be capable of circling over the Y side (upper side) of the four photosensitive bodys 18 corresponding to four colors of toner T of Y, M, C, and K.

Specifically, the intermediate transfer belt 22 is wound around the drive roll 23, the driven roll 25, a rotating member 43 to be described later, a tension-applying roll 32 as an example of a displacement member, the winding roll 27, and the primary transfer roll 24 on the most downstream side. In other words, the intermediate transfer belt 22 is supported to be capable of circling by the drive roll 23, the driven roll 25, the rotating member 43, the tension-applying roll 32, the winding roll 27, and the primary transfer roll 24. No roll is provided between the tension-applying roll 32 and the rotating member 43.

The drive roll 23, the driven roll 25, and the winding roll 27 are examples of a rotating member. The rotation drive of the drive roll 23 enables the intermediate transfer belt 22 to be in contact with the photosensitive body 18 and to circle in a direction (as an example, counterclockwise moving direction (a direction of arrow A) in FIG. 1).

Drive Roll

The drive roll 23 is provided rotatably with the X direction as an axial direction on the Z side and at the center in the Y direction in an apparatus main body 10A of the image forming apparatus 10. In addition, the drive roll 23 rotates in a counterclockwise direction illustrated in the figures by driving of a motor (not illustrated) of which an operation is controlled by a controller 70 provided in the apparatus main body 10A and thereby causes the intermediate transfer belt 22 to perform circling around.

Driven Roll

The driven roll 25 is configured to be driven by the circling of the intermediate transfer belt 22, with the X direction as an axial direction at a position on the Z side and Y side from the drive roll 23. The driven roll 25 becomes a facing roll that faces the secondary transfer roll 26 nipping the intermediate transfer belt 22 therebetween.

Winding Roll

The winding roll 27 is provided rotatably with the X direction as an axial direction at a position on the −Z side and Y side from the drive roll 23 in the apparatus main body 10A. In addition, the winding roll 27 is configured to rotate in the counterclockwise direction illustrated in the figures by the circling of the intermediate transfer belt 22.

Tension-Applying Roll

The tension-applying roll 32 is provided rotatably with the X direction as an axial direction at a position (obliquely upward position) on the −Z side and Y side from the winding roll 27 in the apparatus main body 10A. The tension-applying roll 32 is configured to rotate in the counterclockwise direction illustrated in the figures by the circling of the intermediate transfer belt 22.

Figure 2:
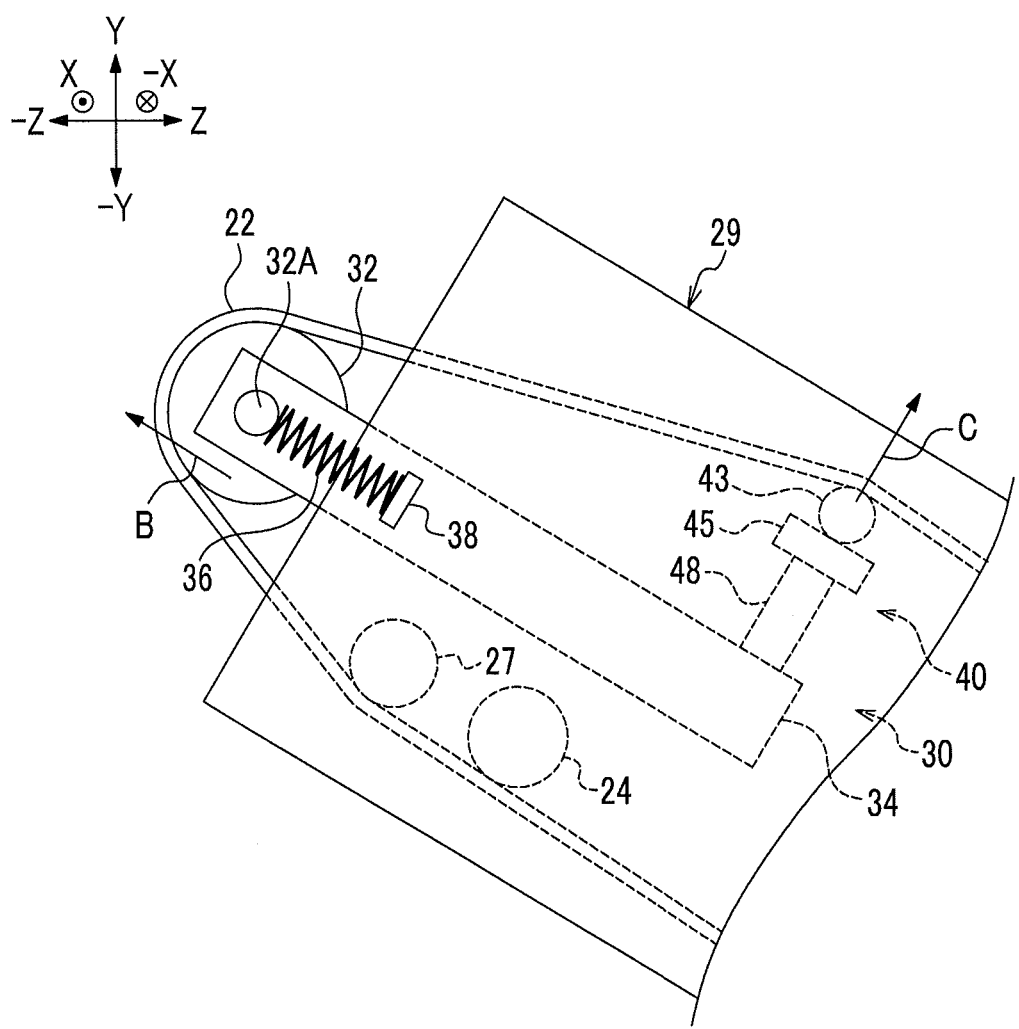
FIG. 2 is a partially enlarged view illustrating a transfer unit according to the first exemplary embodiment.

As illustrated in FIG. 2, the tension-applying roll 32 is biased by the spring 36 with a shaft 32A pointing to the outer side of the intermediate transfer belt 22 such that tension is applied to the intermediate transfer belt 22. Thus, the tension-applying roll 32 is configured to be displaced along one direction (arrow B) on a Z-Y plane while being in contact with the intermediate transfer belt 22.

Spring

The spring 36 illustrated in FIG. 2 is a compression coil spring and is an example of a biasing member. One spring 36 is provided for each of the pair of the side plates 29 (see FIG. 3). In addition, one end of the spring 36 is attached to the attachment section 38 described above and the other end of the spring 36 is in contact with the shaft 32A. Thus, the spring 36 biases the shaft 32A to the side (arrow B side) on which the tension of the intermediate transfer belt 22 is increased. The spring 36 is guided by a holder (not illustrated) in the B direction such that a direction of the biasing force acting on the shaft 32A is not changed.

Primary Transfer Roll

As illustrated in FIG. 1, the primary transfer roll 24 faces the photosensitive body 18 nipping the intermediate transfer belt 22 therebetween. A portion between the primary transfer roll 24 and the photosensitive body 18 becomes a primary transfer position where the toner image G formed on the photosensitive body 18 is transferred to the intermediate transfer belt 22. In addition, a voltage from a voltage applying unit (not illustrated) is applied to the primary transfer roll 24. The primary transfer roll 24 causes the toner image G on the photosensitive body 18 to be primarily transferred to the outer circumferential surface of the intermediate transfer belt 22 by a potential difference between the primary transfer roll 24 and the grounded photosensitive body 18.

The drive roll 23, the driven roll 25, the winding roll 27, the tension-applying roll 32, and the four primary transfer rolls 24 are provided rotatably on the pair of side plates 29 (see FIG. 3) through bearing components (not illustrated).

Secondary Transfer Roll

The secondary transfer roll 26 faces the driven roll 25 nipping the intermediate transfer belt 22 therebetween. A portion between the secondary transfer roll 26 and the driven roll 25 becomes a secondary transfer position where the toner image G is transferred onto the sheet P. In addition, a voltage from a voltage applying unit (not illustrated) is applied to the secondary transfer roll 26. The secondary transfer roll 26 causes the toner image G on the outer circumferential surface of the intermediate transfer belt 22 to be secondarily transferred onto the sheet P by a potential difference between the secondary transfer roll 26 and the grounded driven roll 25.

Residual toner or paper powder attached to the outer circumferential surface of the intermediate transfer belt 22 after the secondary transferring is removed by a cleaning unit (not illustrated).

Belt Moving Unit

Next, the belt moving unit 30 will be described.

As illustrated in FIG. 2, the belt moving unit 30 includes the intermediate transfer belt 22 described above, the tension-applying roll 32 described above, a correction section 40 as an example of an correction unit, and the connection member 34.

Correction Section

As illustrated in FIG. 1, as an example, the correction section 40 is provided at a position closer to the tension-applying roll 32 than the driven roll 25 in a region on the upstream side from the tension-applying roll 32 and on the downstream side from the driven roll 25 in the moving direction (direction of arrow A) of the intermediate transfer belt 22.

As illustrated in FIG. 3, the correction section 40 includes a contact member 42 that comes into contact with an inner surface of the intermediate transfer belt 22, a movement section 44 in which one end of the contact member 42 in the longitudinal direction is movable in the C direction, and a receiving member 46 as an example of a receiving unit that receives a pressing force from the intermediate transfer belt 22 in the X direction. Further, the correction section 40 includes a compression coil spring 54. Each member of the correction section 40 is symmetrically disposed with respect to the center line M described above in the X direction. Therefore, in the following description, the correction section 40 on the sideplate 29 side (X side) will be described, and description of the correction section 40 on the side plate 29 side (−X side) will be omitted.

Contact Member

As illustrated in FIG. 3, the contact member 42 is in contact with the inner surface of the intermediate transfer belt 22 with the X direction, which is the width direction orthogonal to the circling direction (A direction) of the intermediate transfer belt 22 and to the intersecting direction (C direction), as the longitudinal direction. Specifically, the contact member 42 is configured to include the rotating member 43 that comes into contact with the inner surface of the intermediate transfer belt 22, and a supporting member 45 that supports the rotating member 43 rotatably. As an example, the contact member 42 comes into contact with the intermediate transfer belt 22 on the upstream side from the tension-applying roll 32 in the circling direction.

As an example, the rotating member 43 is a cylindrical member formed of steel use stainless (SUS) and a part of the outer circumferential surface thereof is disposed to come into contact with the inner surface of the intermediate transfer belt 22 with the X direction as an axial direction. In addition, the length of the rotating member 43 in the X direction is greater than the width of the intermediate transfer belt 22 in the X direction and the opposite ends of the rotating member 43 in the X direction protrude from the opposite ends of the intermediate transfer belt 22 in the X direction. Further, the receiving member 46 is attached to the opposite ends of the rotating member 43 in the X direction.

The supporting member 45 includes a plate section 45A in which the X direction is the longitudinal direction and the A direction is the lateral direction and regulation sections 45B that are upright on the opposite ends of the plate section 45A in the X direction. The plate section 45A is disposed to face the intermediate transfer belt 22. In addition, a connection section 45C is formed to protrude to the −C side on the undersurface of the plate section 45A. A through-hole (not illustrated) is formed to penetrate through the connection section 45C in the A direction. One end of a link member 48 to be described later is connected to the through-hole of the connection section 45C by a connection pin (not illustrated) with the A direction as the axial direction. A bearing member 47 that supports the rotating member 43 rotatably is attached to the regulation section 45B.

Movement Section

As illustrated in FIG. 3, the movement section 44 includes the link member 48 of which one end is connected to the connection section 45C and an attachment member 52 which is fixed to the connection member 34 to be described later and to which the other end of the link member 48 is connected. The movement section 44 enables the contact member 42 to move in the width direction (X direction) and in the C direction.

As an example, the link member 48 has a shape in which a through-hole (not illustrated), which penetrates in the thickness direction on the opposite ends of a plate that is long in one direction in the longitudinal direction, is formed. As described above, one end of the link member 48 is connected to the connection section 45C of the supporting member 45 and the other end of the link member 48 is connected to the attachment member 52 to be described later by a connection pin (not illustrated) with the A direction as the axial direction. That is, one end of the link member 48 is connected to the connection member 34 rotatably about the axis along the circling direction and the other end thereof is connected to the contact member 42 rotatably about the axis along the circling direction.

In addition, the two link members 48 on the X side and the −X side are disposed as a hypotenuse of an isosceles trapezoid in which the −C side is longer than the C side when viewed in the A direction.

The attachment member 52 includes a cylindrical fixing section 52A and a plate-like connection section 52B that protrudes from the fixing section 52A in the X direction. On the connection section 52B, a through-hole (not illustrated) which penetrates in the thickness direction is formed. A connection pin (not illustrated) with the A direction as the axial direction is inserted into the through-hole on the connection section 52B and the through-hole on the other end of the link member 48 and thereby the other end of the link member 48 is connected to the attachment member 52. Examples of a method of fixing of the fixing section 52A to the connection member 34 include, for example, press-fitting of a boss of the fixing section 52A to a hole portion of the connection member 34, bonding by using an adhesive, or fastening by using a screw.

Receiving Member

As an example, the receiving member 46 is configured as an annular (washer-like) member in which a through-hole (not illustrated) which has an inner diameter slightly greater than the outer diameter of the rotating member 43 is formed at the central portion of a disc. In addition, the receiving member 46 is fitted in a concave portion (not illustrated) which is formed on both sides of the rotating member 43 in the width direction (X direction), the movement thereof with respect to the rotating member 43 in the width direction is regulated, and is rotatable integrally with the rotating member 43.

Further, a height of the receiving member 46 from the rotating member 43 (height from the outer circumferential surface of the rotating member 43 in a radial direction) is set to be greater than the thickness of the intermediate transfer belt 22. Thus, the receiving member 46 is configured to receive the pressing force from the intermediate transfer belt 22 according to the movement of the intermediate transfer belt 22 in the width direction.

Coil Spring

As illustrated in FIG. 3, a boss (not illustrated) which protrudes to the −C side from the undersurface of the opposite ends of the supporting member 45 in the X direction is inserted into the compression coil spring 54. That is, the end of the compression coil spring 54 on the C side is attached to the supporting member 45 and the end thereof on the −C side is a free end and thus the compression coil spring 54 is capable of expanding and contracting in the C direction.

In addition, as an example, the end of the compression coil spring 54 on the −C side is disposed on the C side (upper side) of the link member 48 so as to come into contact with the surface (upper surface) of the link member 48 on the C side when the contact member 42 and the link member 48 move. The compression coil spring 54 applies a resistance force against a force acting in a direction in which the contact member 42 and the link member 48 come into contact with each other. Further, the compression coil spring 54 is configured to apply a biasing force which causes the contact member 42 to move to the C side when the link member 48 rises to the C side.

Connection Member

As illustrated in FIG. 2, as an example, the connection member 34 is formed to be a plate shape in which the B direction is the longitudinal direction and the C direction is the lateral direction. In addition, as illustrated in FIG. 4B, when viewing the connection member 34 in the B direction, a plate-like portion 35 that protrudes to the −X side is formed on a portion of the connection member 34 on the −X side and the −C side. The attachment member 52 is fixed on the plate-like portion 35 by using a screw. The connection member 34 is provided in the side plate 29 by being inserted into a space surrounded by the side plate 29, the sticking-out portions 39A and 39B, and the retaining plates 39C and 39D and is capable of moving (sliding) along the B direction with respect to the side plate 29.

As illustrated in FIG. 4A, a through-hole 34A that penetrates in the X direction is formed on the tip of the connection member 34 in the B direction. In addition, the tip of the connection member 34 in the B direction protrudes further to the tip side (outer side) in the B direction than the side plate 29. The shaft 32A of the tension-applying roll 32 is inserted into the through-hole 34A. The shaft 32A penetrates through the through-hole 34A and protrudes to the X side of the connection member 34 and is biased in the B direction by the spring 36. Thus, the connection member 34 is provided to follow the movement of the tension-applying roll 32 and to be capable of being displaced with respect to the side plate 29 and connects the tension-applying roll 32 and the movement section 44 (see FIG. 4B) to each other.

Comparative Example

Next, a transfer device 200 according to a comparative example will be described. The fundamentally same member and same portion as those in the exemplary embodiment have the same reference signs as in the exemplary embodiment and thus description thereof is omitted.

Figure 11A:
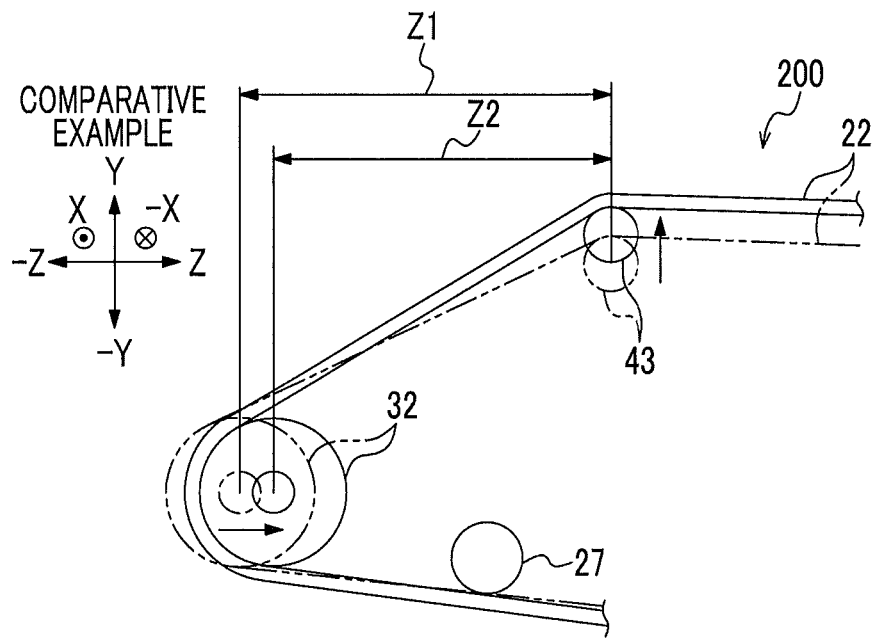
FIG. 11A is a view illustrating a state of displacement of a rotating member and a tension-applying roll according to a comparative example.

In FIG. 11A, the transfer device 200 according to the comparative example is illustrated. In the transfer device 200, the connection member 34 (see FIG. 1) according to the exemplary embodiment is removed and the rotating member 43 and the tension-applying roll 32 are capable of being displaced separately from each other with respect to the side plate 29. The rotating member 43 is capable of being displaced in the Y direction and the tension-applying roll 32 is capable of being displaced in the X direction.

Figure 11B:
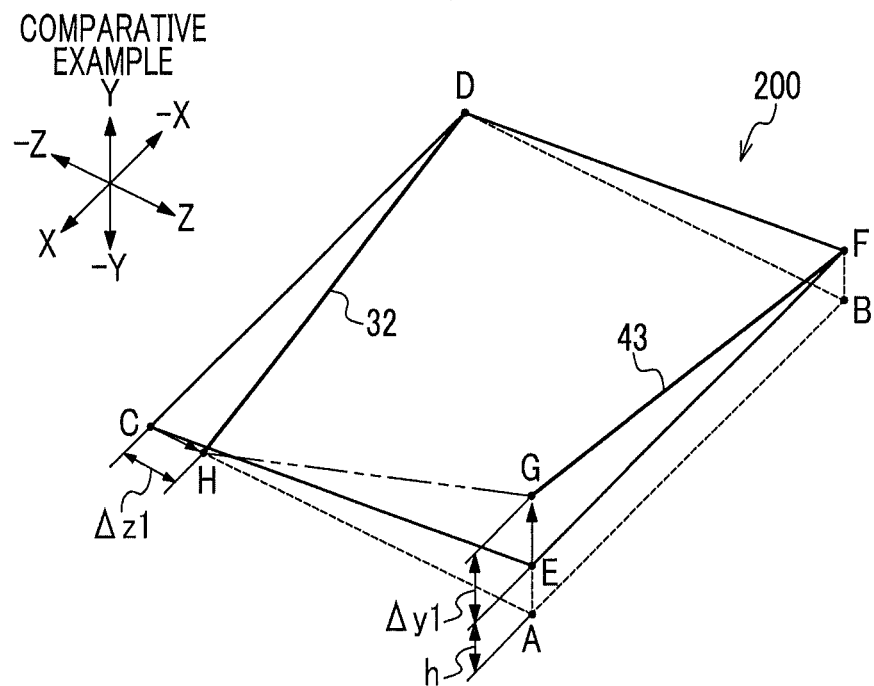
FIG. 11B is a view schematically illustrating a state of displacement of the rotating member and the tension-applying roll according to the comparative example.

FIG. 11B schematically illustrates the disposition of the tension-applying roll 32 and the rotating member 43. A point A, a point B, a point C, and a point D are disposed as four corners of a rectangle when viewed in the Y direction and are positioned on an X-Z plane. The point B is positioned on the −X side from the point A and the point C is positioned on the −Z side from the point A. The point D is positioned on the −Z side from the point B and is positioned on the −X side from the point C. In addition, a point E is positioned to be separated from the point A by a distance h on the Y side and a point F is positioned to be separated from the point B by a distance h on the Y side.

A line CD indicates an initial position of the tension-applying roll 32 before moving (position of a state in which stable tension is applied to the intermediate transfer belt 22 (see FIG. 1)). In addition, a line EF indicates an initial position of the rotating member 43 before moving (mid position). An inter-axis distance between the tension-applying roll 32 and the rotating member 43 at the initial positions is a length of a line CE (=line DF).

As illustrated in FIG. 11A, in the transfer device 200 according to the comparative example, in a case where the intermediate transfer belt 22 is deviated on the X side, the end of the intermediate transfer belt 22 on the X side comes into contact with the receiving member 46 (see FIG. 3) on the X side and thereby the end of the rotating member 43 on the X side moves to the Y side. At this time, since a contact state of the rotating member 43 with the intermediate transfer belt 22 on the X side is different from a contact state on the −X side, a difference between the tension (biasing force) applied to the intermediate transfer belt 22 by the tension-applying roll 32 on the X side and the tension on the −X side is produced. Specifically, the X side of the tension-applying roll 32 is displaced to the Z side rather than the −X side.

Here, as illustrated in FIG. 11B, the end of the rotating member 43 on the X side rises by a distance Δy1 on the Y side and is positioned at a point G and the end of the tension-applying roll 32 on the X side slides by a distance Δz1 on the Z side and is positioned at a point H. At this time, as illustrated in FIG. 11A, an inter-axis distance between the tension-applying roll 32 and the rotating member 43 in the Z direction becomes shorter from a distance Z1 that is the inter-axis distance at an initial position at the end on the X side to a distance Z2. That is, distance Z2=distance Z1−Δz1.

In addition, as illustrated in FIG. 11B, the end of the rotating member 43 on the X side rises by the distance Δy1 on the Y side, and thereby the tension acting on the intermediate transfer belt 22 (see FIG. 11A) on the X side is greater compared to that on the −X side. Thus, the intermediate transfer belt 22 moves to the −X side on which the tension is small.

However, the end of the tension-applying roll 32 on the X side slides by the distance Δz1 on the Z side, and thereby the inter-axis distance (line GH) between the end of the rotating member 43 on the X side and the end of the tension-applying roll 32 on the X side becomes short compared to the inter-axis distance (line FD) on the −X side. The tension acting on the intermediate transfer belt 22 on the X side becomes smaller than the tension acting on the −X side. Therefore, the intermediate transfer belt 22 (see FIG. 11A) is displaced on the X side.

As described above, in the transfer device 200 according to the comparative example, even when the displacement of a portion of the rotating member 43 on the X side to the Y side causes the intermediate transfer belt 22 to move in the −X side, the displacement of the portion of the tension-applying roll 32 on the X side to the Z side causes the intermediate transfer belt 22 to move to the X side. That is, in the transfer device 200 according to the comparative example, there is a possibility that the deviation on the intermediate transfer belt 22 is not sufficiently suppressed. The deviation means a state in which the position of the intermediate transfer belt 22 reaches the end of the rotating member 43 in the X direction as a result of movement of the intermediate transfer belt 22 in the X direction.

Action

Next, an action of the first exemplary embodiment will be described.

Action of Correction Section

Figure 5A:
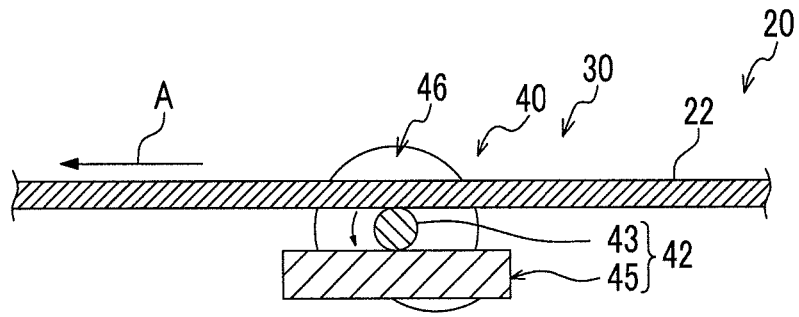
FIG. 5A is a view of a longitudinal section schematically illustrating a contact state of a rotating member with the intermediate transfer belt of the correction section according to the first exemplary embodiment.

As illustrated in FIG. 5A, in the correction section 40 of the transfer unit 20, when the intermediate transfer belt 22 circles in the A direction, the rotating member 43 that comes into contact with the inner surface of the intermediate transfer belt 22 is driven to rotate. Therefore, in the correction section 40, a friction force (load) acting on the intermediate transfer belt 22 is decreased compared to a case where the rotating member 43 is fixed.

Figure 6A:
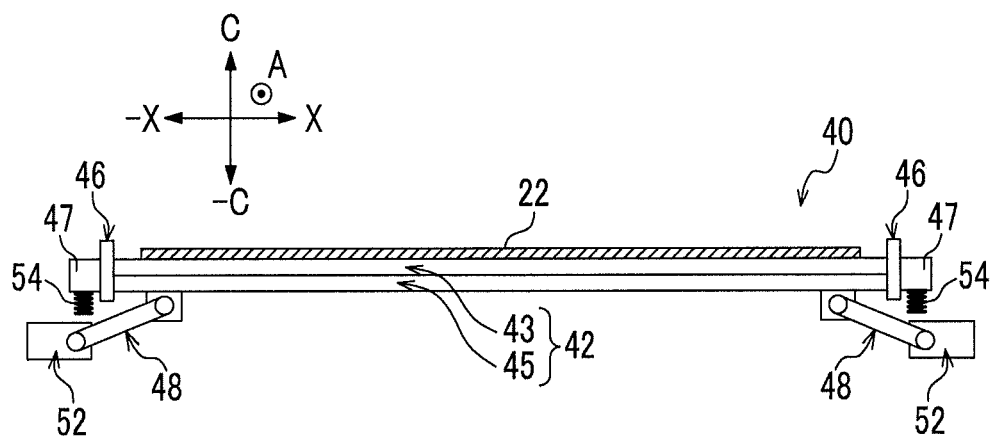
FIG. 6A is a view schematically illustrating the correction section when the rotating member according to the first exemplary embodiment is disposed at an initial position.

As illustrated in FIG. 6A, in a state in which the movement of the intermediate transfer belt 22 in the X direction does not occur, there is no movement of the contact member 42 and the link member 48 in the X direction. The intermediate transfer belt 22 performs circling in the A direction without a contact with the receiving member 46.

Here, for example, in a case where a stretched state of the intermediate transfer belt 22 is changed due to any factors such as maintenance of the transfer unit 20 (see FIG. 1), the intermediate transfer belt 22 moves to the X side or −X side in some cases. Here, as an example, it is considered that the intermediate transfer belt 22 moves on the X side.

Figure 5B:
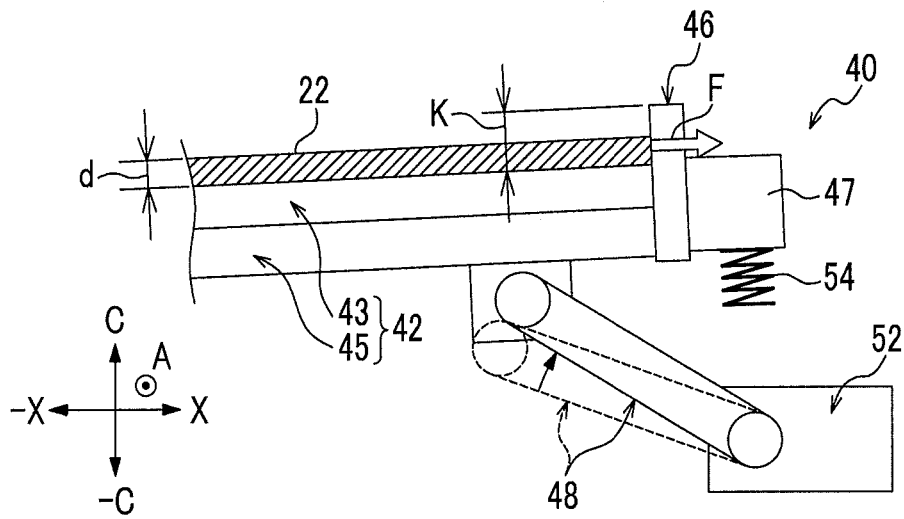
FIG. 5B is a view schematically illustrating one end on a side to which the intermediate transfer belt moves in the correction section according to the first exemplary embodiment.

As illustrated in FIG. 5B, when the intermediate transfer belt 22 continues moving to the X side, the end of the intermediate transfer belt 22 on the X side comes into contact with a surface of the receiving member 46 on the −X side. Accordingly, the receiving member 46 receives a pressing force F toward the X side from the intermediate transfer belt 22. The pressing force F causes the contact member 42 to move to the X side and causes the link member 48 on the X side, which is connected to the contact member 42, to rise to the C side.

Figure 5C:
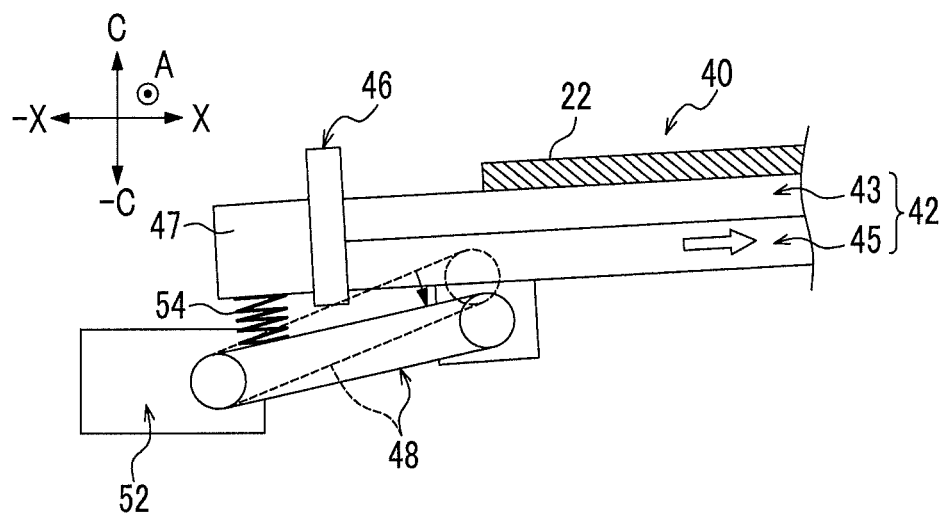
FIG. 5C is a view schematically illustrating the other end in the correction section according to the first exemplary embodiment.

As illustrated in FIG. 5C, according to the rising of the link member 48 on the X side to the C side, the link member 48 on the −X side, which is connected to the contact member 42, drops down to the −C side, on the −X side of the contact member 42. At this time, the contact member 42 and the link member 48 approach each other; however, the compression coil spring 54 comes into contact with the surface of the link member 48 on the C side, and thereby a resistance force against the contact of the contact member 42 with the link member 48 is applied. That is, even in a case where the contact member 42 makes a great movement, a large displacement of the contact member 42 is suppressed (decreased) by the compression coil spring 54.

Figure 6B:
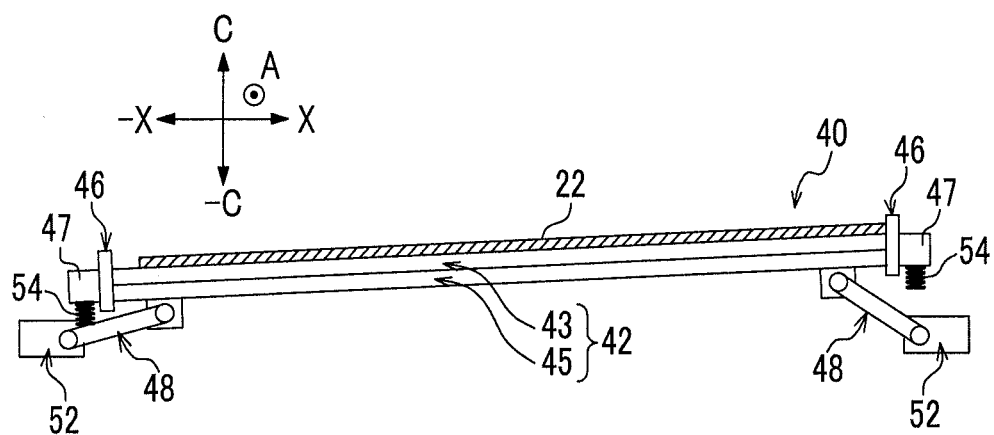
FIG. 6B is a view schematically illustrating a state in which the intermediate transfer belt moves to the one end side of the rotating member according to the first exemplary embodiment.

Subsequently, as illustrated in FIG. 6B, when the end of the contact member 42 on the X side rises to the C side, the intermediate transfer belt 22 has a higher tension at the end on the X side than at the end on the −X side and moves to the −X side on which the tension is smaller. That is, a reaction force to return the intermediate transfer belt 22 to the center in the X direction is produced. This reaction force matches a force by which the intermediate transfer belt 22 is caused to move to the X side, and thereby the deviation of the intermediate transfer belt 22 in the X direction is suppressed. In addition, at this time, movement of the contact member 42 in the X direction is stopped. Therefore, the contact member 42 is held in a state of being inclined in which the end thereof on the X side is positioned higher than the end on the −X side.

Further, in the correction section 40, the rotating member 43 comes into contact with the entire inner surface of the intermediate transfer belt 22 in the X direction and supports the intermediate transfer belt 22. Therefore, in the correction section 40, since the intermediate transfer belt 22 circles stably compared to a configuration in which only the end of the intermediate transfer belt 22 comes into contact with a member such that the deviation is suppressed, the posture of the intermediate transfer belt 22 is stabilized.

In a case where the intermediate transfer belt 22 moves to the −X side, the link member 48 on the −X side rises, and the link member 48 on the X side drops down. The contact member 42 is held in an inclined state in which a force to cause the intermediate transfer belt 22 to move to the −X side matches a force to cause the movement to the X side, and the deviation of the intermediate transfer belt 22 is suppressed.

Action of Connection Member

Figure 7A:
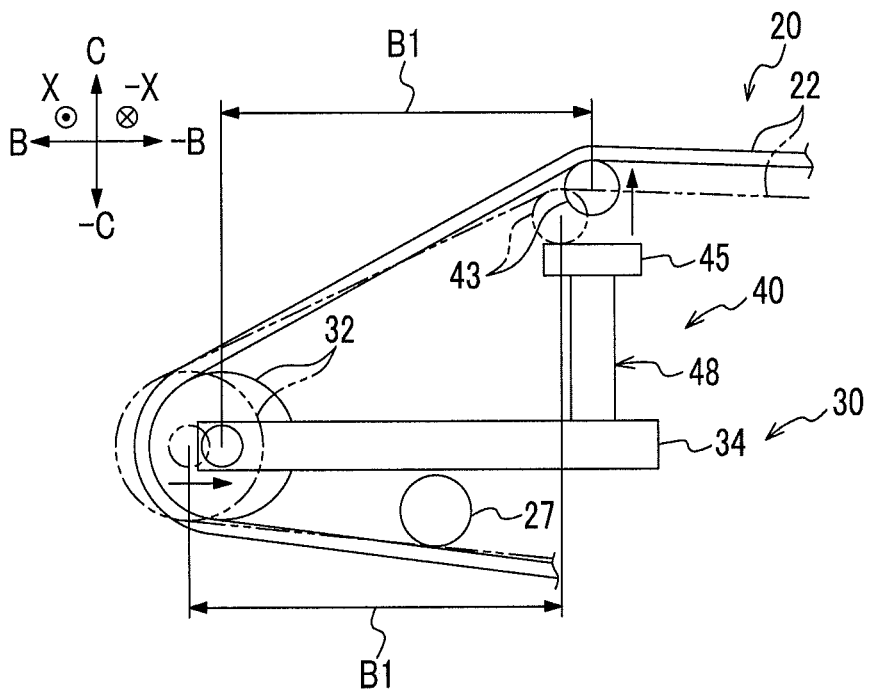
FIG. 7A is a view illustrating a state of displacement of the rotating member and a tension-applying roll according to the first exemplary embodiment.

FIG. 7A illustrates the transfer unit 20 and the belt moving unit 30 according to the first exemplary embodiment. In the B direction that is the biasing direction, the side on which the tension-applying roll 32 biases the intermediate transfer belt 22 is described as the B side and a side opposite (inner side) by 180° to the B side is described as a −B side.

Figure 7B:
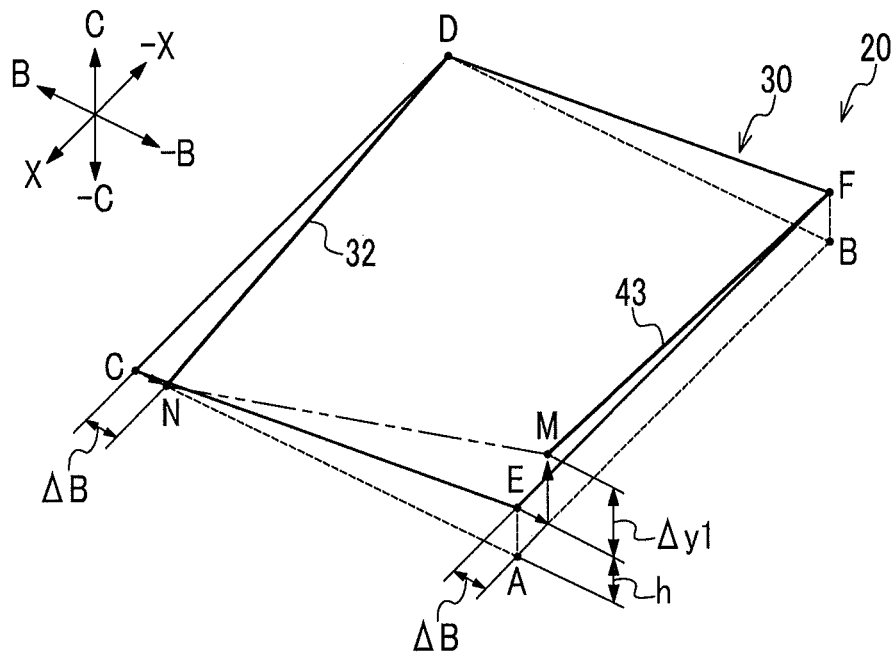
FIG. 7B is a view schematically illustrating a state of displacement of the rotating member and the tension-applying roll according to the first exemplary embodiment.

FIG. 7B schematically illustrates the disposition of the tension-applying roll 32 and the rotating member 43. A point A, a point B, a point C, and a point D are disposed as four corners of a rectangle when viewed in the Y direction and are positioned on an X-B plane. The point B is positioned on the −X side from the point A and the point C is positioned on the B side from the point A. The point D is positioned on the B side from the point B and is positioned on the −X side from the point C. In addition, a point E is positioned to be separated from the point A by a distance h on the Y side and a point F is positioned to be separated from the point B by a distance h on the Y side.

A line CD indicates an initial position of the tension-applying roll 32 before moving. In addition, a line EF indicates an initial position of the rotating member 43 before moving. An inter-axis distance between the tension-applying roll 32 and the rotating member 43 at the initial positions is a length of a line CE (=line DF).

As illustrated in FIG. 7A, in the belt moving unit 30, in a case where the intermediate transfer belt 22 is deviated on the X side, the end of the intermediate transfer belt 22 on the X side comes into contact with the receiving member 46 (see FIG. 3) on the X side and thereby the end of the link member 48 on the X side rises up to the C side. The end of the rotating member 43 on the X side rises up to the C side and the X side of the tension-applying roll 32 is displaced to the −B side rather than on the −X side.

Here, as illustrated in FIG. 7B, when the end of the rotating member 43 on the X side rises by a distance Δy1 on the C side, the tension acting on the intermediate transfer belt 22 (see FIG. 7A) does not change on the X side and on the −X side. Therefore, the end of the tension-applying roll 32 on the X side slides by the distance AB on the −B side and is positioned at a point N. In addition, since the tension-applying roll 32 and the rotating member 43 are connected to each other by the connection member 34, the end of the rotating member 43 on the X side which is positioned at the point E is positioned at a point M by a distance AB on the −B side from the point E and by a distance Δy1 to the C side. At this time, an inter-axis distance B1 (see FIG. 7A) between the tension-applying roll 32 and the rotating member 43 in the B direction does not change.

Subsequently, the end of the rotating member 43 on the X side rises by the distance Δy1 on the C side, and thereby the tension acting on the intermediate transfer belt 22 (see FIG. 7A) on the X side is greater compared to that on the −X side. Thus, the intermediate transfer belt 22 moves to the −X side on which the tension is small.

Here, as described above, the inter-axis distance in the B direction between the end of the rotating member 43 on the X side and the end of the tension-applying roll 32 on the X side does not change. Therefore, a line NM that is the inter-axis distance between the end of the tension-applying roll 32 on the X side after moving and the end of the rotating member 43 on the X side is longer compared to the line GH (see FIG. 11B) according to the comparative example. That is, according to the exemplary embodiment, a difference between the tension of the intermediate transfer belt 22 on the X side due to the movement of the tension-applying roll 32 and the tension on the −X side is unlikely to be produced. Thus, in the belt moving unit 30, when the rotating member 43 rises on the C side, the displacement of the intermediate transfer belt 22 to the X side is suppressed compared to the comparative example.

In the belt moving unit 30 according to the first exemplary embodiment, a force to cause the intermediate transfer belt 22 to move to the X side matches the reaction force thereagainst, and thus the deviation of the intermediate transfer belt 22 to the X side is suppressed. In addition, in the belt moving unit 30, a force to cause the intermediate transfer belt 22 to move to the −X side matches the reaction force thereagainst, and thus the deviation of the intermediate transfer belt 22 to the −X side is suppressed. By the action, in the belt moving unit 30, the deviation of the intermediate transfer belt 22 in the X direction is suppressed compared to the comparative example. That is, the degradation of the deviation correcting performance of the intermediate transfer belt 22 by the correction section 40 is suppressed.

In addition, in the belt moving unit 30, as illustrated in FIG. 2, the spring 36 biases the tension-applying roll 32 in the B direction. Therefore, as illustrated in FIG. 7A, in a case where the tension-applying roll 32 moves (is displaced) to the −B side, the reaction force toward the B side during moving to the −B side continues to act on the tension-applying roll 32. Thus, since an abrupt displacement of the tension-applying roll 32 to the −B side is suppressed, the posture of the intermediate transfer belt 22 is stable even in a case where the tension-applying roll 32 is displaced.

In addition, in the belt moving unit 30, as illustrated in FIG. 5B, the pressing force F of the intermediate transfer belt 22 is received by the receiving member 46, the link member 48 rises to the C side, and then, the tension on one side of the intermediate transfer belt 22 in the X direction becomes strong. While the intermediate transfer belt 22 moves to the other side in the X direction on which the tension is weak, the movement is stopped at a position where the forces match each other. In this way, in the belt moving unit 30, since the force of the deviation to one side of the intermediate transfer belt 22 is used as a drive force to return the intermediate transfer belt 22 to the other side, there is no need to use a drive source for returning the intermediate transfer belt 22 to the other side. That is, there is no need to use the drive source to move the contact member 42, and the deviation of the intermediate transfer belt 22 in the X direction is corrected automatically.

In the transfer unit 20, since the deviation of the intermediate transfer belt 22 is suppressed by the belt moving unit 30, an occurrence of transferring failure (for example, positional shift of the toner image G to the set transferring position) of the toner image G to the sheet P due to the deviation of the intermediate transfer belt 22 is suppressed.

In the image forming apparatus 10 illustrated in FIG. 1, when a primary transferring of the toner image G to the intermediate transfer belt 22 from the photosensitive body 18 is performed by the primary transfer roll 24, the deviation of the intermediate transfer belt 22 is suppressed due to the action of the belt moving unit 30. Further, in the image forming apparatus 10, when the secondary transferring of the toner image G to the sheet P from the intermediate transfer belt 22 is performed by the secondary transfer roll 26, the deviation of the intermediate transfer belt 22 is suppressed due to the action of the belt moving unit 30. By the action, in the image forming apparatus 10, an occurrence of transferring failure (for example, positional shift) of the toner image G to the sheet P from the photosensitive body 18 is suppressed and an occurrence of image failure due to the transferring failure is suppressed.

Second Exemplary Embodiment

Next, examples of a belt circling device, a transport device, and an image forming apparatus according to the second exemplary embodiment are described. The fundamentally same member and same portion as those in the first exemplary embodiment have the same reference signs as in the first exemplary embodiment and thus description thereof is omitted.

Figure 8:
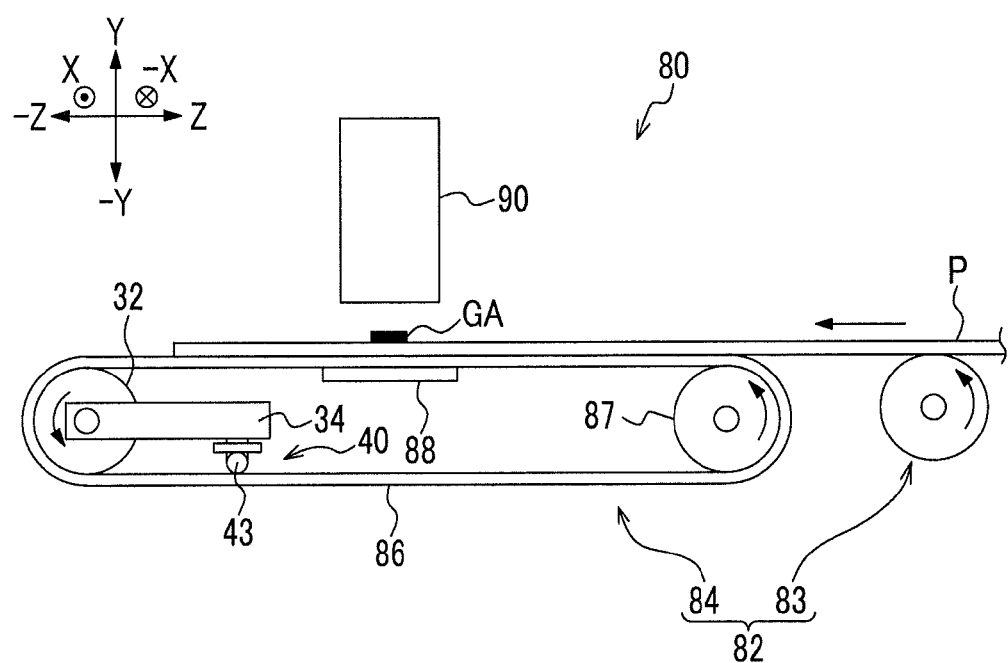
FIG. 8 is a view schematically illustrating an image forming apparatus according to a second exemplary embodiment.

FIG. 8 illustrates an image forming apparatus 80 according to the second exemplary embodiment. The image forming apparatus 80 includes a transport unit 82 as an example of the transport device and an ink jet head 90 as an example of a forming unit.

Transport Unit

As illustrated in FIG. 8, the transport unit 82 includes a supply roll 83 as an example of a supply unit and a belt moving unit 84 as an example of a belt circling device. The supply roll 83 is provided rotatably with the X direction as an axial direction and is driven to rotate by a motor (not illustrated).

Belt Moving Unit

Figure 9A:
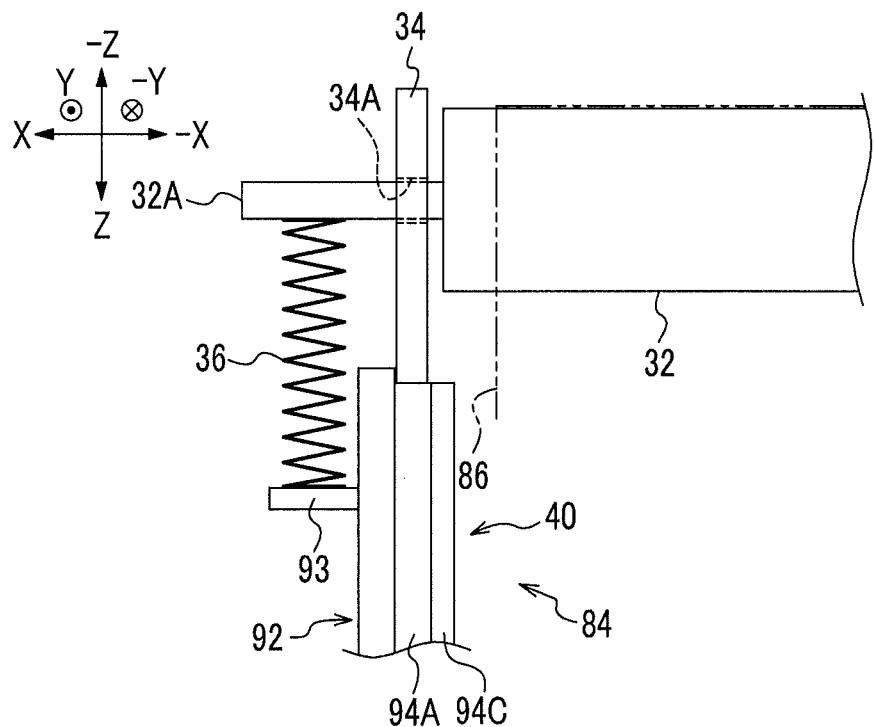
FIG. 9A is an enlarged plan view illustrating a part of a correction section according to the second exemplary embodiment.

The belt moving unit 84 includes a transport belt 86 as an example of a belt, the tension-applying roll 32, the correction section 40, the connection member 34, a drive roll 87, a support plate 88, and a side plate 92 (see FIG. 9A). No roll is provided between the tension-applying roll 32 and the rotating member 43.

The transport belt 86 is configured as an endless (annular) belt. In addition, the transport belt 86 is wound around the drive roll 87 and the tension-applying roll 32 and is supported to be capable of circling. Further, a portion on the downstream side from the drive roll 87 in the transport belt 86 and on the upstream side from the tension-applying roll 32 is disposed to face an ink ejecting portion of the ink jet head 90. On the inner side of the portion of the transport belt 86 which faces the ink jet head 90, support plates 88 are arranged along an X-Z plane. The portion of the transport belt 86 which faces the inkjet head 90 is supported by the support plates 88.

The drive roll 87 is provided rotatably with the X direction as an axial direction and is driven to rotate by a motor (not illustrated). In addition, the drive roll 87 is spaced from the tension-applying roll 32 in the Z direction and is disposed to the Z side from the tension-applying roll 32 (upstream side of the transporting direction of the sheet P).

The correction section 40 is disposed on the tension-applying roll 32. In addition, the rotating member 43 is disposed at a position on the downstream side from the tension-applying roll 32 in a moving direction of the transport belt 86 and on the upstream side from the drive roll 87. The rotating member 43 comes into contact with the inner surface of the transport belt 86.

The side plates 92 illustrated in FIG. 9A are provided to be spaced from each other along a Y-Z plane in the X direction. Since the correction section 40 is symmetrically disposed to have the same configuration on the X side and on the −X side, the correction section 40 on the X side will be described, but the description thereof on the −X side will be omitted.

Figure 9B:
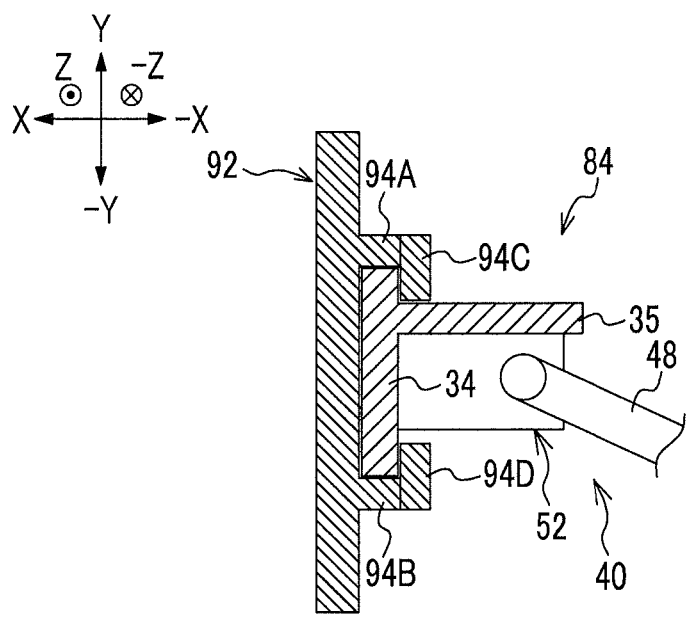
FIG. 9B is a view of an enlarged longitudinal section illustrating apart of the correction section according to the second exemplary embodiment.

As illustrated in FIG. 9B, an attachment section 93 that protrudes from the side plate 92 on the X side is formed on the side plate 92. The attachment section 93 is a plate-like section which expands along an X-Y plane. In addition, one end of the spring 36 is attached to the attachment section 93.

As illustrated in FIG. 9B, plate-like sticking-out portions 94A and 94B which are spaced from each other in the Y direction and stick out from the side plate 92 toward the −X side are formed on the −X side of the side plate 92. A retaining plate 94C is attached to one end of the sticking-out portion 94A on the −X side by using a screw (not illustrated). In addition, a retaining plate 94D is attached to one end of the sticking-out portion 94B on the −X side by using a screw (not illustrated). The retaining plate 94C and the retaining plate 94D are disposed to be spaced in the Y direction. The connection member 34 is inserted into a space surrounded by the side plate 92, the sticking-out portions 94A and 94B, and the retaining plates 94C and 94D.

Action

Next, action according to the second exemplary embodiment will be described.

Figure 10:
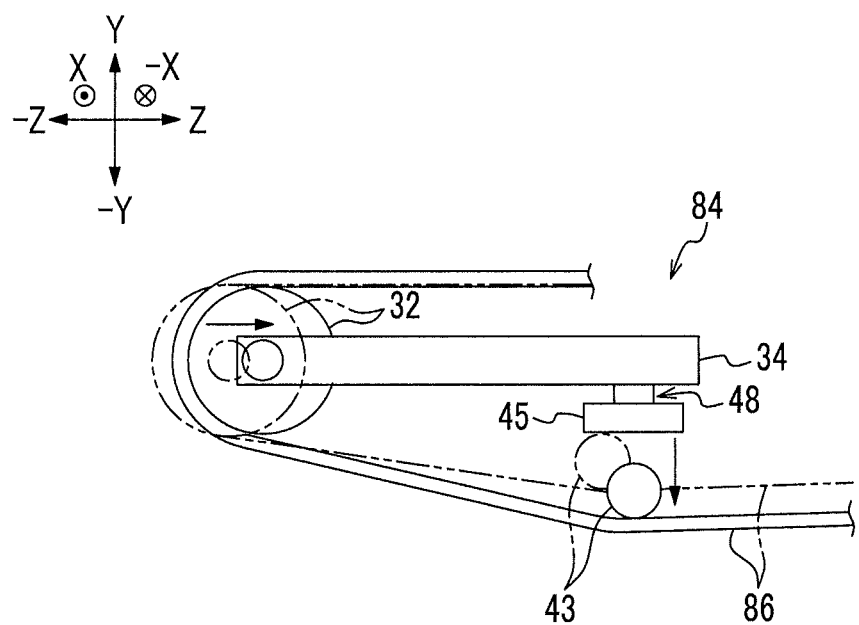
FIG. 10 is a view illustrating a state of displacement of a rotating member and a tension-applying roll according to the second exemplary embodiment.

In the belt moving unit 84 illustrated in FIG. 10, as an example, in a case where the transport belt 86 is deviated on the X side, the end of the transport belt 86 on the X side comes into contact with the receiving member 46 (see FIG. 3) on the X side and thereby the end of the rotating member 43 on the X side is lowered on the −Y side. The X side of the tension-applying roll 32 is displaced to the Z side rather than to the −X side.

That is, when the end of the rotating member 43 on the X side is lowered on the −Y side, the tension acting on the transport belt 86 does not change on the X side and on the −X side. Therefore, the end of the tension-applying roll 32 on the X side slides on the Z side. In addition, since the tension-applying roll 32 and the rotating member 43 are connected to each other by the connection member 34, the inter-axis distance between the tension-applying roll 32 and the rotating member 43 in the Z direction does not change.

Subsequently, when the end of the rotating member 43 on the X side is lowered on the −Y side, the tension acting on the transport belt 86 on the X side is made greater compared to that on the −X side. Thus, the transport belt 86 moves to the −X side on which the tension is small.

Here, as described above, the inter-axis distance in the Z direction between the end of the rotating member 43 on the X side and the end of the tension-applying roll 32 on the X side does not change. Therefore, the inter-axis distance between the end of the tension-applying roll 32 on the X side after moving and the end of the rotating member 43 on the X side is longer, compared to a state in which the rotating member 43 and the tension-applying roll 32 are separated from each other and are displaced. That is, in the belt moving unit 84, when the rotating member 43 is lowered on the −Y side, the displacement of the transport belt 86 on the X side is suppressed, compared to the comparative example in which the rotating member 43 and the tension-applying roll 32 are separated from each other and are displaced.

Thus, in the belt moving unit 84 according to the second exemplary embodiment, a force to cause the transport belt 86 to move to the X side matches the reaction force thereagainst, and thus the deviation of the transport belt 86 to the X side is suppressed. This action is the same on the −X side. By the action, in the belt moving unit 84, the deviation of the transport belt 86 in the X direction is suppressed. That is, in the belt moving unit 84, the degradation of the deviation correcting performance of the transport belt 86 by the correction section 40 is suppressed, compared to the comparative example.

In addition, in the belt moving unit 84, the spring 36 (see FIG. 9A) biases the tension-applying roll 32 in the −Z direction. Therefore, in a case where the tension-applying roll 32 moves (is displaced) to the Z side, the reaction force toward the −Z side during moving to the Z side continues to act on the tension-applying roll 32. Thus, since an abrupt displacement of the tension-applying roll 32 to the Z side is suppressed, the posture of the transport belt 86 is stable even in a case where the tension-applying roll 32 is displaced.

Further, in the belt moving unit 84, the pressing force of the transport belt 86 is received by the receiving member 46 (see FIG. 3), the link member 48 is lowered to the −Y side, and then, the tension on one side of the transport belt 86 in the X direction becomes strong. The transport belt 86 moves to the other side in the X direction on which the tension is weak. In this way, in the belt moving unit 84, since the force of the deviation to one side of the transport belt 86 is used as a drive force to return the transport belt 86 to the other side, there is no need to use a drive source for returning the transport belt 86 to the other side.

In addition, in the transport unit 82, since the deviation of the transport belt 86 is suppressed by the belt moving unit 84, an occurrence of transporting failure of the sheet P due to the deviation of the transport belt 86 is suppressed.

In addition, in the image forming apparatus 80 in which the transport unit 82 illustrated in FIG. 8 is provided, the deviation of the transport belt 86 is suppressed by an action of the belt moving unit 84. Thus, in the image forming apparatus 80, an occurrence of the positional shift of an ink image GA (image failure) is suppressed.

The invention is not limited to the exemplary embodiments described above.

The belt is not limited to the intermediate transfer belt 22 and the transport belt 86, but may include a fixing belt or a photosensitive body belt. In addition, a belt in which a through-hole is formed or of which the surface is uneven may be included.

The displacement member is not limited to the tension-applying roll 32 that is biased by the spring 36, but may include a driven roll which is supported rotatably and slidably by the side plate on which a Long hole is formed.

The contact member is not limited to the contact member 42 including the rotating member 43, but may include a member which is not rotatable. The correction section 40 is not limited to the section disposed on the upstream side from the tension-applying roll 32, but may include a section provided on the downstream side from the tension-applying roll 32. In addition, the belt moving unit 30 is not limited to a unit that suppresses the deviation of the belt using the receiving member 46 and the link member 48 without using a drive source, but may include a unit that performs displacement of the contact member 42 or the like by using a drive source such as a motor.

The receiving member 46 may have a height that is less than the thickness of the intermediate transfer belt 22, as long as the intermediate transfer belt 22 does not deviate to the outside in the X direction. In addition, the height of the receiving member 46 may be the same as the thickness of the intermediate transfer belt 22. Further, the receiving member 46 may not only rotate in accordance with the rotating member 43, but also may be rotatable, relative to the rotating member 43.

The plural link members 48 may be provided along the moving direction of the intermediate transfer belt 22.

The biasing member is not limited to the spring 36, but may include another elastic member such as a flat spring. In addition, the biasing member may include a damper that decelerates (attenuates) an abrupt movement speed of the contact member 42.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A belt circling device comprising:
   a belt supported so as to circle by a plurality of rotating members provided rotatably on side plates;
   a displacement member that is displaced while being in contact with the belt;
   a correction unit that includes a contact member that is in contact with the belt on an upstream side or on a downstream side from the displacement member in a circling direction of the belt and a movement section that causes the contact member to be movable in an intersecting direction intersecting with the circling direction and that corrects a deviation of the moving belt; and
   a connection member that is provided on the side plate, is displaced with respect to the side plate in a displacement direction together with the displacement member, and connects the displacement member and the movement section to each other, wherein the connection member extends along the displacement direction between first and second ends of the connection member, the displacement member is connected to the connection member at the first end, and the movement section is connected to the connection member at the second end, wherein
   a receiving section is disposed on both sides of the contact member in a width direction which intersects the circling direction and the intersecting direction, and receives a pressing force from the belt according to a movement of the belt in the width direction, and
   the movement section includes a plurality of link members of which one end is connected to the connection member rotatably about an axis along the circling direction and the other end is connected to the contact member rotatably about the axis along the circling direction and which are arranged in parallel in the width direction.

2. The belt circling device according to claim 1, further comprising:
   a biasing member that biases the displacement member to a side on which tension of the belt is increased.

3. A transfer device comprising:
   the belt circling device according to claim 1;
   a first transfer member that causes a developer image to be transferred to an outer circumferential surface of the belt; and
   a second transfer member that causes the developer image transferred to the belt to be transferred to a recording medium.

4. An image forming apparatus comprising:
   a forming unit that forms a developer image; and
   the transfer device according to claim 3 that causes the developer image to be transferred to the belt and transfers the developer image transferred to the belt to a recording medium.

* * * * *